(12) United States Patent
Ketharaju

(10) Patent No.: US 11,682,057 B1
(45) Date of Patent: Jun. 20, 2023

(54) MANAGEMENT SYSTEM TO FACILITATE VEHICLE-TO-EVERYTHING (V2X) NEGOTIATION AND PAYMENT

(71) Applicant: Wells Fargo Bank, N.A., San Francisco, CA (US)

(72) Inventor: Rameshchandra Bhaskar Ketharaju, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 97 days.

(21) Appl. No.: 17/141,879

(22) Filed: Jan. 5, 2021

(51) Int. Cl.
| | | |
|---|---|---|
| *G06Q 30/06* | (2023.01) | |
| *G06Q 10/02* | (2012.01) | |
| *G06Q 20/10* | (2012.01) | |
| *G06Q 20/36* | (2012.01) | |
| *G06Q 20/40* | (2012.01) | |

(Continued)

(52) U.S. Cl.
CPC ......... *G06Q 30/0611* (2013.01); *G06Q 10/02* (2013.01); *G06Q 20/102* (2013.01); *G06Q 20/3672* (2013.01); *G06Q 20/405* (2013.01); *G06Q 30/0613* (2013.01);

(Continued)

(58) Field of Classification Search
None
See application file for complete search history.

(56) References Cited

U.S. PATENT DOCUMENTS

| | | | |
|---|---|---|---|
| 6,754,485 B1 * | 6/2004 | Obradovich | ............ H04L 67/12 340/7.52 |
| 6,856,820 B1 | 2/2005 | Kolls | |

(Continued)

FOREIGN PATENT DOCUMENTS

| | | |
|---|---|---|
| CN | 108597128 A | 9/2018 |
| CN | 109034780 A | 12/2018 |

(Continued)

OTHER PUBLICATIONS

Zhang, J., et al., "Indoor Parking Method Based on Cooperation of Intelligent Vehicle and Parking Lot," (Abstract only) Journal of Physics: Conference Series, 1651.1 IOP Publishing Ltd. (Nov. 25, 2002). (Year: 2020).*

(Continued)

*Primary Examiner* — Nicholas D Rosen
(74) *Attorney, Agent, or Firm* — Shumaker & Sieffert, P.A.

(57) ABSTRACT

Techniques are described for a management system to facilitate a negotiation process and payment for a requested resource between a vehicle and a supplier machine. The vehicle sends a request for the resource to the management system. In response, the management system is configured to identify a set of candidate supplier machines from a plurality of supplier machines that provide the requested resource in accordance with one or more resource parameters. The management system then initiates a negotiation process with each of the supplier machines within the set of candidate supplier machines based on one or more negotiation parameters. Once a transaction for the requested resource is agreed upon, the management system forms a smart contract between the vehicle, the supplier machine, and the management system. The management system executes the smart contract once the resource request is fulfilled to disburse funds from the vehicle to the supplier machine.

23 Claims, 4 Drawing Sheets

(51) Int. Cl.
*H04W 4/44* (2018.01)
*G06Q 30/0601* (2023.01)
*G06Q 50/18* (2012.01)

(52) U.S. Cl.
CPC ..... *G06Q 30/0617* (2013.01); *G06Q 30/0637* (2013.01); *G06Q 50/188* (2013.01); *H04W 4/44* (2018.02)

(56) References Cited

U.S. PATENT DOCUMENTS

| | | | | |
|---|---|---|---|---|
| 7,810,025 | B2* | 10/2010 | Blair | G06Q 30/06 |
| | | | | 715/239 |
| 8,219,490 | B2 | 7/2012 | Hammad et al. | |
| 10,032,319 | B2* | 7/2018 | Ricci | G06K 7/10316 |
| 10,600,096 | B2* | 3/2020 | McQuade | G06Q 30/08 |
| 10,776,879 | B1* | 9/2020 | Floyd | G06Q 30/0611 |
| 10,932,156 | B2* | 2/2021 | Amorim de Faria Cardote | H04W 4/46 |
| 11,097,742 | B2* | 8/2021 | Kanehara | B60W 60/001 |
| 11,240,211 | B2* | 2/2022 | Benson | H04L 9/0643 |
| 11,304,040 | B2* | 4/2022 | Balasubramanian | G06V 40/10 |
| 11,367,356 | B1* | 6/2022 | Ketharaju | B60W 60/0025 |
| 2004/0049337 | A1 | 3/2004 | Knockeart et al. | |
| 2004/0104842 | A1 | 6/2004 | Drury et al. | |
| 2005/0065878 | A1* | 3/2005 | Trolio | G06Q 30/02 |
| | | | | 705/40 |
| 2006/0041840 | A1* | 2/2006 | Blair | G06F 40/154 |
| | | | | 715/234 |
| 2007/0155406 | A1 | 7/2007 | Dowling et al. | |
| 2011/0102189 | A1 | 5/2011 | Murray et al. | |
| 2012/0136527 | A1* | 5/2012 | McQuade | G06Q 30/08 |
| | | | | 705/26.4 |
| 2013/0018705 | A1 | 1/2013 | Heath et al. | |
| 2013/0132286 | A1* | 5/2013 | Schaefer | G06Q 10/06 |
| | | | | 705/305 |
| 2014/0309806 | A1 | 10/2014 | Ricci | |
| 2015/0348169 | A1* | 12/2015 | Harris | G06Q 30/0633 |
| | | | | 705/26.8 |
| 2015/0363986 | A1 | 12/2015 | Hoyos et al. | |
| 2016/0086391 | A1 | 3/2016 | Ricci | |
| 2016/0203649 | A1 | 7/2016 | Berkobin et al. | |
| 2016/0239903 | A1 | 8/2016 | Othmer | |
| 2016/0302046 | A1 | 10/2016 | Velusamy | |
| 2017/0046632 | A1* | 2/2017 | Fabris | G06Q 10/02 |
| 2017/0067747 | A1 | 3/2017 | Ricci | |
| 2017/0212511 | A1 | 7/2017 | Paiva Ferreira et al. | |
| 2017/0287038 | A1* | 10/2017 | Krasadakis | G06Q 30/0201 |
| 2017/0337813 | A1 | 11/2017 | Taylor | |
| 2018/0012427 | A1* | 1/2018 | Ricci | G06Q 10/20 |
| 2018/0144322 | A1 | 5/2018 | Unnerstall | |
| 2018/0268418 | A1 | 9/2018 | Tanksali | |
| 2019/0043135 | A1 | 2/2019 | Kawamoto et al. | |
| 2019/0102850 | A1* | 4/2019 | Wheeler | G06Q 20/405 |
| 2019/0193742 | A1* | 6/2019 | Kanehara | G05D 1/0088 |
| 2019/0208442 | A1* | 7/2019 | Amorim de Faria Cardote | H04L 45/44 |
| 2019/0226856 | A1* | 7/2019 | Ghannam | G08G 1/0141 |
| 2019/0312815 | A1 | 10/2019 | Altman et al. | |
| 2020/0041994 | A1 | 2/2020 | Alalao et al. | |
| 2020/0042019 | A1 | 2/2020 | Marczuk et al. | |
| 2020/0043574 | A1 | 2/2020 | Mehrotra et al. | |
| 2020/0050198 | A1 | 2/2020 | Donnelly | |
| 2020/0051194 | A1 | 2/2020 | Park et al. | |
| 2020/0145191 | A1 | 5/2020 | Qi et al. | |
| 2020/0151661 | A1 | 5/2020 | Mezaael | |
| 2020/0193826 | A1 | 6/2020 | Dozono et al. | |
| 2020/0202355 | A1* | 6/2020 | Feng | H04L 9/0637 |
| 2020/0209002 | A1 | 7/2020 | Hou et al. | |
| 2020/0209845 | A1 | 7/2020 | Chen | |
| 2020/0241869 | A1 | 7/2020 | Niemiec et al. | |
| 2020/0259885 | A1 | 8/2020 | Alam et al. | |
| 2020/0272950 | A1* | 8/2020 | Xu | G08G 1/146 |
| 2020/0344470 | A1 | 10/2020 | Shen et al. | |
| 2020/0344622 | A1 | 10/2020 | Campbell, Jr. et al. | |
| 2020/0363807 | A1 | 11/2020 | Haque et al. | |
| 2020/0364953 | A1 | 11/2020 | Simoudis | |
| 2020/0379079 | A1 | 12/2020 | Dupray et al. | |
| 2020/0401162 | A1 | 12/2020 | Lisewski et al. | |
| 2020/0409369 | A1 | 12/2020 | Zaytsev et al. | |
| 2021/0016772 | A1 | 1/2021 | Golov | |
| 2021/0046897 | A1 | 2/2021 | Ferguson et al. | |
| 2021/0082291 | A1 | 3/2021 | Villa et al. | |
| 2021/0084015 | A1* | 3/2021 | Benson | H04L 63/0428 |
| 2021/0142232 | A1* | 5/2021 | Handler | G06Q 30/0222 |
| 2021/0182454 | A1 | 6/2021 | Smaili et al. | |
| 2021/0191402 | A1 | 6/2021 | Zhu et al. | |
| 2021/0201357 | A1 | 7/2021 | Singhal et al. | |
| 2021/0326974 | A1* | 10/2021 | Leng | G06Q 30/08 |
| 2022/0022013 | A1* | 1/2022 | Balasubramanian | G06V 40/161 |

FOREIGN PATENT DOCUMENTS

| | | |
|---|---|---|
| IN | 201841011516 | 2/2019 |
| WO | 2017122976 A1 | 7/2017 |

OTHER PUBLICATIONS

Di Napoli, C., et al., "A city-aware car parks marketplace for smart parking," (Abstract Only) ICAART 2021, Proceedings of the 13th International Conference on Agents and Artificial Intelligence, 1:242-249, SciTePress. (Year: 2021).*

Human translation of Chinese patent document CN-109034780-A, obtained from LinguaLex Language Solutions on Sep. 8, 2022. (Year: 2022).*

Dannemman, "When your car can see more than you can" retrieved from https://lwww.qualcomm.com/news/nq/2020/04/23/when-your-car-can-see-more-you-can, Apr. 23, 2020, 12 pp.

Leiding et al., "Enabling the Vehicle Economy Using a Blockchain-Based Value Transaction Layer Protocol for Vehicular Ad-Hoc Networks", Research Paper, Version 1.3.0, Mar. 31, 2019, 28 pp.

Williams, "BMW pilots in-car food ordering with delivery app Olo" Mobile Marketer. Retrieved from https:/lwww.mobilemarketer.com/news/bmw-pilots-in-car-food-{)rdering-with-delivery-app-{)lo/567958/, Nov. 25, 2019, 2 pp.

Khoshnoud, "It's not hype: Blockchain could revolutionize fleet management and mobility services." Retrieved from https://insights.conduent.com/conduent-blog/it-s-not-hype-blockchain-could-revolutionize-fleet-management-and-mobility-services, Feb. 13, 2019, 3 pages.

"How blockchain can benefit fleet management and trucking," Retrieved from https://www.wexinc.com/insights/blog/efs-fleet/blockchain-benefit-fleet-management/, Jan. 24, 2019, 7 pages.

"Core System Requirements Specification (SyRS)", U.S. Department of Transportation's Core, retrieved from www.its.dot.gov/meetings/pdf/CoreSystem_SE_SyRS_RevA%20(Jun. 13, 2011).pdf, Jun. 13, 2011, 131 pages.

U.S. Appl. No. 16/820,326, filed Mar. 16, 2020, naming inventor Ketharaju.

* cited by examiner

MANAGEMENT SYSTEM TO FACILITATE VEHICLE-TO-EVERYTHING (V2X) NEGOTIATION AND PAYMENT

TECHNICAL FIELD

This disclosure relates to computer-based management of transactions for vehicles.

BACKGROUND

Vehicular communication systems are computer networks in which connected vehicles and roadside unit are communicating nodes that provide each other with information, such as safety warnings and traffic information. Vehicle communication systems may be effective in assisting the connected vehicles to avoid accidents and traffic congestion based on the shared information. Each connected vehicle may include hardware, antenna(s), radio(s), and software to broadcast messages and to establish connections between proximate vehicles (sometimes referred to as vehicle-to-vehicle or V2V communication), infrastructure-based units (sometimes referred to as vehicle-to-infrastructure or V2I communication), mobile device-based units (sometimes referred to as vehicle-to-device or V2D communication), and network device-based units (sometimes referred to as vehicle-to-network or V2N communication) (collectively referred to as vehicle-to-everything or V2X communication). V2X communication may be wireless local area network (WLAN)-based, referred to as dedicated short-range communication (DSRC), using the underlying wireless radio communication protocols. Alternatively, V2X communication may be cellular-based, referred to as cellular V2X or C-V2X, using the underlying mobile telecommunications protocols.

SUMMARY

In general, this disclosure describes techniques for a management system to facilitate a negotiation process and payment for a requested resource between a vehicle and a supplier machine. The management system may comprise one or more computing devices, e.g., a management server, associated with or integrated into a traffic management system and configured to communicate with vehicles, e.g., using vehicle-to-everything (V2X) communication. In one example, the management system may communicate with a transportation grid computing system to facilitate transactions with other vehicles to provide freeway priority to the vehicle. In other examples, the management system may communicate with a resource vendor computing system to facilitate transactions with private parking lots, lodging establishments, or other resource vendors to reserve parking spots, lodgings, or other resources for the vehicle and/or users of the vehicle. In a further example, the management system may communicate with a merchant computing system to facilitate transactions with merchants or businesses to facilitate ordering and curbside pickup of goods by the vehicle.

The vehicle sends a request for the resource to the management system. In response, the management system is configured to identify a set of candidate supplier machines from a plurality of supplier machines that provide the requested resource in accordance with the one or more resource parameters, such as date, time, and geographical location ranges for the resource. The management system then initiates a negotiation process with each of the supplier machines within the set of candidate supplier machines based on one or more negotiation parameters, such as a monetary range that the user of the vehicle is willing to pay for the requested resource. Once the negotiation process is complete and a transaction for the requested resource is agreed upon, the management system forms a smart contract between the vehicle, the supplier machine, and the management system, which may be written to a block chain. The management system includes a payment node in communication with a transaction gateway for one or more financial institutions. The payment node executes the smart contract once the resource request is fulfilled to disburse funds for the transaction from a digital wallet within the vehicle or the vehicle's financial institution to the supplier machine or the supplier machine's financial institution.

In one example, this disclosure is directed to a method comprising receiving, by a management server and from a vehicle, a request for a resource, the request including one or more resource parameters and one or more negotiation parameters; identifying, by the management server, a set of candidate supplier machines from a plurality of supplier machines in communication with the management server, wherein the set of candidate supplier machines includes one or more supplier machines that provide the resource requested by the vehicle in accordance with the one or more resource parameters included in the request from the vehicle; initiating, by the management server and on behalf of the vehicle, a negotiation process with each of the supplier machines within the set of candidate supplier machines based on the one or more negotiation parameters included in the request from the vehicle; and once a transaction for the resource is agreed upon between the vehicle and a supplier machine within the set of candidate supplier machines, facilitating, by the management server, an electronic transfer of funds between the vehicle and the supplier machine in exchange for the supplier machine providing the resource to the vehicle in accordance with the transaction.

In another example, this disclosure is directed to a management server comprising one or more interfaces, and one or more processors in communication with the one or more interfaces. The one or more processors are configured to receive, from a vehicle via the one or more interfaces, a request for a resource, the request including one or more resource parameters and one or more negotiation parameters; identify a set of candidate supplier machines from a plurality of supplier machines in communication with the management server, wherein the set of candidate supplier machines includes one or more supplier machines that provide the resource requested by the vehicle in accordance with the one or more resource parameters included in the request from the vehicle; initiate, on behalf of the vehicle and via the one or more interfaces, a negotiation process with each of the supplier machines within the set of candidate supplier machines based on the one or more negotiation parameters included in the request from the vehicle; and once a transaction for the resource is agreed upon between the vehicle and a supplier machine within the set of candidate supplier machines, facilitate, via the one or more interfaces, an electronic transfer of funds between the vehicle and the supplier machine in exchange for the supplier machine providing the resource to the vehicle in accordance with the transaction.

In a further example, this disclosure is directed to a non-transitory computer readable medium comprising instructions that, when executed, cause one or more processors of a management server to receive, from a vehicle, a request for a resource, the request including one or more resource parameters and one or more negotiation parameters; identify a set of candidate supplier machines from a plurality of supplier machines in communication with the management server, wherein the set of candidate supplier machines includes one or more supplier machines that provide the resource requested by the vehicle in accordance with the one or more resource parameters included in the request from the vehicle; initiate, on behalf of the vehicle, a negotiation process with each of the supplier machines within the set of candidate supplier machines based on the one or more negotiation parameters included in the request from the vehicle; and once a transaction for the resource is agreed upon between the vehicle and a supplier machine within the set of candidate supplier machines, facilitate an electronic transfer of funds between the vehicle and the supplier machine in exchange for the supplier machine providing the resource to the vehicle in accordance with the transaction.

The details of one or more examples are set forth in the accompanying drawings and the description below. Other features, objects, and advantages will be apparent from the description and drawings, and from the claims.

DETAILED DESCRIPTION

Modern cities have traffic management systems and transportation grid computing systems that are used to regulate traffic at junctions and traffic signals. These systems do not, however, solve the problem of traffic congestion nor do they provide commuters an option for priority passage. In the future, an artificial intelligence (AI)-based solution in an autonomous vehicle may be time- and memory-consuming to continuously assess the situation and attempt to make a decision to avoid traffic congestion or provide priority passage. Even with vehicle-to-vehicle (V2V) connected cars, navigating through traffic congestion is not easy.

In another situation, while driving, a user of a vehicle may determine that they want to spend the night at a motel or hotel but it might not have any vacancy available, or the user may want to take rest in a rest area but no spots are available in the parking area. Prime parking spots (or any parking spot) in public parking lots and/or garages (e.g., at airports, metro stations, offices, schools, sporting events, concert venues, streets, etc.,) are often not available when needed. In yet another situation, while driving, a user of a vehicle may determine that they need to pick up food or other goods at a store, but may not want to enter the store. Online ordering and curbside pickup are currently available at large retail and grocery stores, but cannot be performed while driving as it requires a user to select and purchase the goods via the store's website or mobile application.

The management system described in this disclosure facilitates a negotiation process and payment for a requested resource between a vehicle and a supplier machine, e.g., another vehicle, a resource vendor, or a store. The management system includes a management server associated with or integrated into the traffic management system and configured to communicate with vehicles, e.g., using V2X communication. The management server is configured to identify candidate supplier machines based on a resource request received from a vehicle, participate in a negotiation or auction for the resource on behalf of the requesting vehicle, and facilitate payment for the received resource between the requesting vehicle and the supplier machine. In this way, the management server provides a technical solution to the above described issues and shortcomings arising in the technical area of connected vehicles and V2X communications. The technical solution described herein provides an electronic platform configured to safely and dynamically negotiate and purchase use of a limited resource on behalf of a requesting vehicle without requiring ongoing input from a user of the vehicle.

Figure 1:
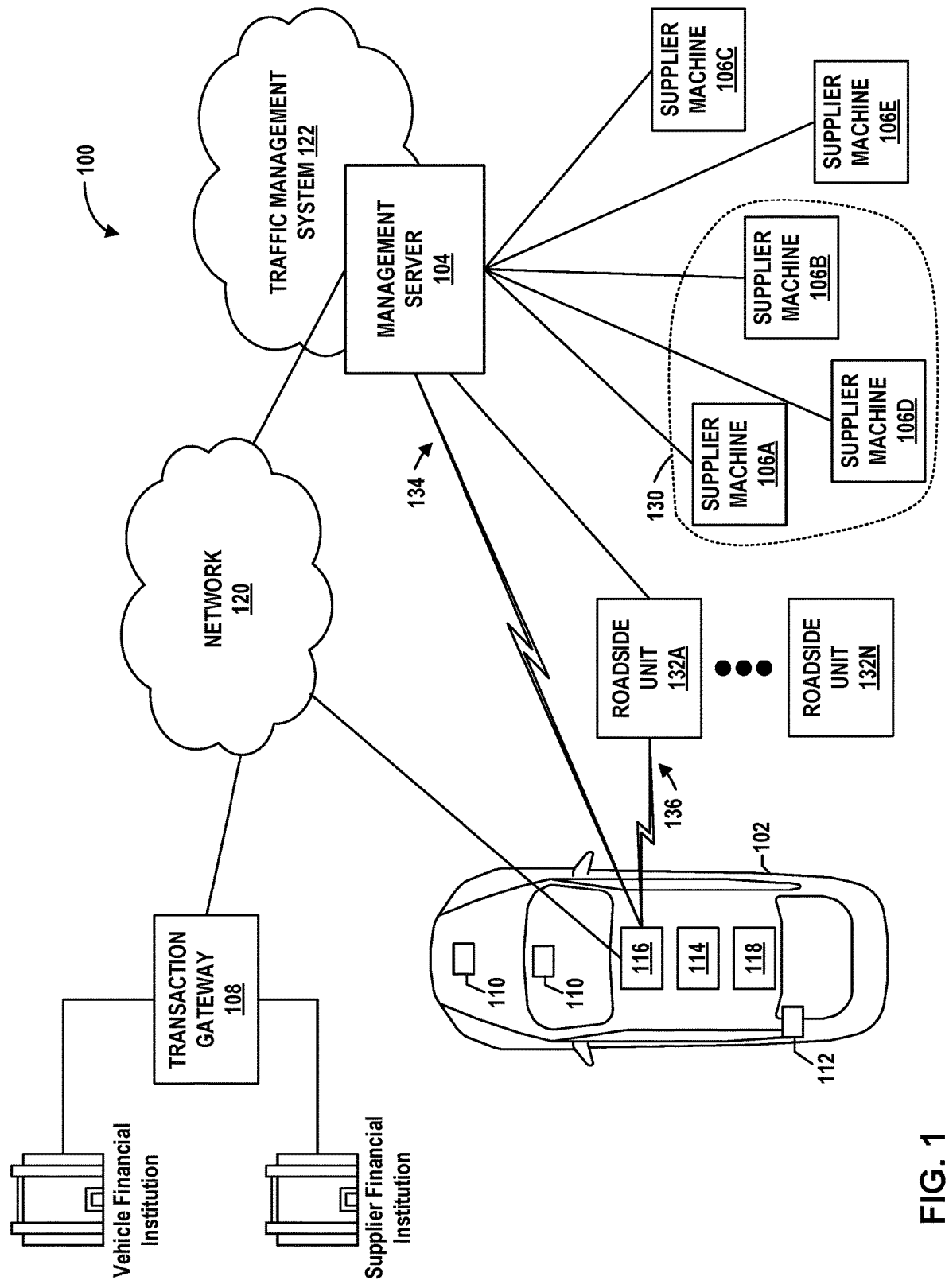
FIG. 1 illustrates a system including a management server configured to facilitate transactions for requested resources between a vehicle and one or more supplier machines, operating in accordance with the teachings of this disclosure.

FIG. 1 illustrates a system 100 including a management server 104 configured to facilitate transactions for requested resources between a vehicle 102 and one or more supplier machines 106A-106E (collectively, "supplier machines 106"), operating in accordance with the teachings of this disclosure. While in the illustrated example, a single vehicle is illustrated, management server 104 may manage or facilitate transactions on behalf of multiple vehicles.

As shown in the example of FIG. 1, management server 104 is configured to facilitate a negotiation process and payment for requested resources between vehicle 102 and one of supplier machines 106. Management server 104 may be associated with or integrated into traffic management system 122. Traffic management system 122 includes a plurality of roadside units 132A-132N (collectively, "roadside units 132") configured to communicate with passing vehicles using V2X communication to exchange information, such as safety warnings and traffic information. In one scenario, management server 104 may comprise a roadside unit, e.g., one of roadside units 132, within traffic management system 122. In other scenarios, management server 104 may be a separate unit or device in communication with a plurality of roadside nodes 132 within traffic management system 122 using network communications. In either scenario, management server 104 may be part of a vehicular communication system using V2X communication to exchange information between connected vehicles and/or other machines, between vehicle 102 and one or more of supplier machines 106.

Through traffic management system 122, management server 104 may communicate with organizations or businesses offering one or more resources for vehicles and/or users of the vehicles. In this way, management server 104 may be a third-party system that is providing a service to the organizations or businesses offering the resources and the vehicles looking for the resources. In some examples, management server 104 may be associated with one or more financial institutions, e.g., credit card companies or banks. Supplier machines 106 may comprise one or more computing devices or systems capable of providing the one or more resources.

In one example, management server 104 may communicate with a transportation grid computing system that may include one or more grid controllers that are each configured to control a grid (i.e., a portion of the highways, streets, junctions, and traffic signals) in a given geographical area. In this example, supplier machines 106 may comprise one or more other vehicles traveling within the same or an adjacent grid as vehicle 102. Management server 104 may facilitate a transaction between vehicle 102 and at least one of supplier machines 106, e.g., another vehicle, to provide freeway priority to vehicle 102 while traveling through one or more grids controlled by the transportation grid computing system.

In another example, management server 104 may communicate with a resource vendor computing system for a given organization or business offering a specific resource (e.g., parking space reservations or room reservations) at multiple facilities (e.g., multiple parking garages or multiple lodging establishments) in a given geographical area. In other examples, the resource vendor computing system may be a third-party system that offers a management service to multiple individually-owned facilities that offer the same or similar resources. Supplier machines 106 may comprise one or more computing devices associated with the facilities (e.g., the parking garages or lodging establishments) or other vehicles that have an available reservation for least one of the resources. Management server 104 may facilitate a transaction between vehicle 102 and at least one of supplier machines 106 to procure reservations for parking spots, lodgings, or other resources managed by the resource vendor computing system.

In a further example, management server 104 may communicate with a merchant computing system for a given organization or business offering goods for order and curbside pickup (e.g., groceries or household goods) at multiple stores in a given geographical area. In other examples, the merchant computing system may be a third-party system that offers a management service to multiple individually-owned stores that do not have the infrastructure for online ordering and curbside pickup. Supplier machines 106 may comprise one or more computing devices associated with the stores themselves. Management server 104 may facilitate a transaction between vehicle 102 and at least one of supplier machines 106, e.g., a store, to order goods for curbside pickup managed by the merchant computing system.

In accordance with techniques of this disclosure, vehicle 102 sends a request for a resource (e.g., freeway priority, a parking space reservation, a room reservation, groceries or other goods, etc.) to management server 104. In some examples, vehicle 102 may communicate with management server 104 directly using a V2X communication session 134 over network 120. In other examples, vehicle 102 may communicate with management server 104 through one of roadside units 132, e.g., roadside unit 132A, using a V2X communication session 136 over network 120.

In response to the request, management server 104 identifies a set 130 of candidate supplier machines that provide the requested resource in accordance with one or more resource parameters included in the request from vehicle 102. In the illustrated example, set 130 includes supplier machines 106A, 106B, and 106D. The resource parameters specified in the resource request from vehicle 120 may include one or more of a geographical location range, a date range, a time range, a rating range, a prioritized list, or an itemized list for the resource requested by vehicle 102. In one example, the resource parameters may include a geographical location of vehicle 102, e.g., a determined geographical location of vehicle 102 at a current time or a specified geographical location of the vehicle at a future time depending on when the requested resource is needed. In this example, management server 104 may identify the set 130 of candidate supplier machines as including one or more supplier machines 106 that provide the resource requested by vehicle 102 and are within a predefined distance from the geographical location of vehicle 102 as specified in the received request from vehicle 102.

Management server 104 then initiates a negotiation process with each of the candidate machines 106A, 106B, and 106D included in the set 130 of candidate supplier machines based on one or more negotiation parameters included in the request from vehicle 102. The negotiation parameters may specify a monetary range that the user of vehicle 102 is willing to pay for the requested resource. In addition to the monetary range, the negotiation parameters may further include one or more of offer or bid increments, time or duration of negotiations, permissions to surpass a maximum value of the monetary range, or notification settings in the case of negotiation success or failure. As one example, management server 104 may identify three other vehicles, e.g., 106A, 106B, and 106D, having freeway priority over requesting vehicle 102 and send a notification to each of the three vehicles offering an initial monetary amount in exchange for the vehicle's priority. If none of the other vehicles accepts the offer, management server 104 may incrementally increase the amount of money up to a threshold specified by the negotiation parameters included in the request from vehicle 102.

The negotiation process is complete once a transaction for the requested resource offered by management server 104 is agreed upon by one of the supplier machines 106, e.g., supplier machine 106A, within the set 130 of candidate supplier machines. Management server 104 then creates a smart contract for the transaction between vehicle 102, supplier machine 106A, and management server 104. The smart contract may be written to a block chain, exchanged via communication channels between the machines, or otherwise securely stored.

Management server 104 is also in communication with a transaction gateway 108 connected to one or more financial institutions. The transaction gateway 108 may, for example, include a portal that routes transactions to credit card companies and/or banks. Management server 104 is configured to execute the smart contract formed between vehicle 102, supplier machine 106A, and management server 104 once the resource request is fulfilled to disburse funds for the transaction via digital wallets and/or the associated financial institutions. For example, management server 104 may submit the transaction defined in the smart contract to transaction gateway 108 to disburse funds for the transaction from an account at the financial institution of vehicle 102 to an account at the financial institution of supplier machine 106A. In another example, management server 104 may be configured to execute the smart contract to disburse funds for the transaction directly from a digital wallet included within vehicle 102 to a digital wallet included within supplier machines 106A, or some combination of embedded digital wallets and financial institution accounts accessible via transaction gateway 108.

Returning to the freeway priority example above, upon acceptance of the offer from management server 104 on behalf of vehicle 102 by one of the other vehicles, e.g., vehicle 106A, management server 104 generates a smart contract between vehicle 102, the other vehicle 106A, and management server 104. Once vehicle 102 receives the other vehicle's freeway priority, management server 104 executes the smart contract and instructs an associated bank via transaction gateway 108 or an associated digital wallet to distribute the agreed upon funds from an account associated with vehicle 102 to an account associated with the other vehicle 106A.

In the example where vehicle 102 requests a parking space reservation or a room reservation, management server 104 operates in a similar manner. For example, management server 104 may communicate with a parking management computing system to identify supplier machines 106, e.g., parking lots or garages having available-for-reservation parking spaces or, if all parking spaces are reserved/taken, other vehicles having reservations for those spaces that may be willing to sell their parking space reservation to vehicle 102. As a further example, management server 104 may communication with a lodging management computing system to identify supplier machines 106, e.g., lodging establishments having available-for-reservation rooms or, if all rooms are reserved/taken, other vehicles having reservations for those rooms that may be willing to sell their room reservation to vehicle 102. A negotiation process, as described above, may occur with the set 130 of identified candidate supplier machines. Once vehicle 102 arrives at the parking garage and receives the reserved parking space or arrives at the lodging establishment and receives the reserved room, management server 104 executes the smart contract and instructs the associated bank or digital wallet to disburse the agreed upon funds from an account associated with vehicle 102 to an account associated with the one of supplier machines 106.

Furthermore, in the example where vehicle 102 requests goods for curbside pickup, the management server 104 operates in a similar manner. For example, management server 104 may comprise a merchant computing system to identify nearby stores that carry the requested goods and communicate with at least one store's computing system to request the goods for curbside pickup within a time window provided by vehicle 102. Once the goods are received in vehicle 102 (e.g., placed in a trunk or other physical storage area of vehicle 102), management server 104 executes the smart contract and instructs the associated bank to distribute payment for the goods from a bank account associated with vehicle 102 to the store.

Vehicle 102 may be a standard gasoline powered vehicle, a hybrid vehicle, an electric vehicle, a fuel cell vehicle, and/or any other mobility implement type of vehicle (e.g., boats, planes, drones, etc.). Vehicle 102 includes parts related to mobility, such as a powertrain with an engine, a transmission, a suspension, a driveshaft, and/or wheels, etc. Vehicle 102 may be non-autonomous, semi-autonomous (e.g., some routine motive functions controlled by the vehicle 102), or autonomous (e.g., motive functions are controlled by the vehicle 102 without direct driver input). In some examples, vehicle 102 may be part of a fleet of vehicles that may be managed by a fleet management system (not shown) in communication with traffic management system 122. An example fleet management system is described in more detail in U.S. patent application Ser. No. 16/820,326 entitled "Autonomous Fleet Service Management," filed Mar. 16, 2020, the entire content of which is incorporated herein by reference.

In the illustrated example, vehicle 102 includes sensors 110, electronic control units (ECUs) 112, a telemetry unit 114, an on-board communications platform 116, and an on-board transaction unit 118. Sensors 110 may be arranged in and around vehicle 102 in any suitable fashion. Sensors 110 may include camera(s), sonar, RADAR, LiDAR, ultrasonic sensors, optical sensors, or infrared devices configured to measure properties around the exterior of vehicle 102. Additionally, some sensors 110 may be mounted inside the passenger compartment of vehicle 102 or in the body of vehicle 102 (such as, the engine compartment, the wheel wells, etc.) to measure properties in the interior of vehicle 102. For example, such sensors 110 may include accelerometers, odometers, pitch and yaw sensors, wheel speed sensors, cameras, microphones, and thermistors, tire pressure sensors (e.g., TMPS systems), biometric sensors, etc. Sensors 110 provide information that can be used to determine the status of vehicle 102.

ECUs 112 are hardware units that monitor and/or control a function or a group of functions on vehicle 102. ECUs 112 may cooperate by transmitting data (e.g., sensor data, control signals, status information, etc.) over one or more vehicle data buses (e.g., data bus 202 of FIG. 2 below). ECUs 112 may incorporate and/or be communicatively coupled to one or more of the sensors 110. ECUs 112 may include, for example, a steering control unit that controls and monitors the power steering system of vehicle 102, a braking control unit that controls and monitors an anti-lock braking system, a transmission control unit that controls transmission functions and shifting based on a transmission fluid temperature sensor, a brake pedal position sensor, a throttle position sensor, and/or an engine control unit that manage an air fuel mixture and emission control systems of vehicle 102 based off input from sensors 110 in the engine compartment, etc. ECUs 112 are discrete sets of electronics that include their own circuit(s) (such as integrated circuits, microprocessors, memory, storage, etc.) and firmware, sensors, actuators, and/or mounting hardware.

Telemetry unit 114 compiles information about vehicle 102 and/or driver performance by collecting data from sensors 110 and/or ECUs 112 within vehicle 102. For example, telemetry unit 114 may collect data related to vehicle emissions via a catalytic converter sensor, piston misfiring via a crankshaft position sensor, fuel mixture monitoring via the engine control unit, etc. In some examples, telemetry unit 114 collects diagnostic information from ECUs 112 in a diagnostic mode when the diagnostic mode is available. In examples where vehicle 102 is part of a vehicle fleet, telemetry unit 114 may compile raw data to be transmitted to the fleet management system, or telemetry unit 114 may perform some data processing (e.g., sorting, aggregation, filtering, validating, etc.) before the data is transmitted.

On-board communications platform 116 includes wireless network interfaces to enable network communication with an external network 120. For example, on-board communications platform 116 may facilitate communication between vehicle 102 and management server 104 over network 120, e.g., using V2X communication session 134, via roadside units 132 using V2X communication session 136, or using other network communications. On-board communications platform 116 also includes hardware (e.g., processors, memory, storage, etc.) and software to control the wireless network interfaces. Network 120 may be a collection of one or more networks, including standards-based networks (e.g., local area wireless networks (including IEEE 802.11 a/b/g/n/ac or others), personal area networks (including Bluetooth®, Bluetooth® Low Energy, Zigbee®, Z-Wave®, near field communication (NFC), etc.), and/or wide area networks (e.g., GSM®, Long Term Evolution (LTE)™; WiMAX (IEEE 802.16), WiGig (IEEE 802.11ad/ay, etc.), ultra-wideband communication (5G), etc.)). For example, on-board communications platform 116 may include an electronic subscriber identification module (eSIM) to support communicating via one or more cellular networks.

In the illustrated example, telemetry unit 114 is separate from on-board communications platform 116. However, in some examples, telemetry unit 114 may be incorporated into on-board communications platform 116. In some examples, telemetry unit 114 and/or on-board communications platform 116 may be referred to as an "Internet-of-Things (IoT) machine" (e.g., when telemetry unit 114 and/or on-board communications platform 116 are a third party device installed after vehicle 102 is manufactured, etc.).

In some examples, the on-board communications platform 116 includes a global positioning system (GPS) receiver (or any other satellite-based location system) to determine a current geographical location of the vehicle 102 to, for example, include as one of the resource parameters in a request for a resource sent to management server 104. The current geographical location of vehicle 102 may also be used to facilitate navigating to a geographical location of the one of supplier machines 106 providing the requested resource to vehicle 102.

On-board communication platform 116 also includes a vehicle communication system unit that includes hardware, antenna(s), radio(s) and software to broadcast messages and to establish connections between proximate vehicles (sometimes referred to as vehicle-to-vehicle or V2V communication), infrastructure-based units (sometimes referred to as vehicle-to-infrastructure or V2I communication), mobile device-based units (sometimes referred to as vehicle-to-device or V2D communication), and network device-based units (sometimes referred to as vehicle-to-network or V2N communication) (collectively referred to as V2X communication). The vehicle communication system may comprise a dedicated short range communication (DSRC) unit that facilitates wireless local area network (WLAN)-based V2X communication using the underlying wireless radio communication protocols. Alternatively, the vehicle communication system may comprise a cellular V2X or C-V2X unit that facilitates cellular-based V2X communication using the underlying mobile telecommunications protocols.

For example, on-board communications platform 116 may facilitate communication directly between vehicle 102 and management server 104 using V2X communication session 134 or between vehicle 102 and management server 104 via one or more of roadside units 132 using V2X communication session 136. The example DSRC unit may, for example, implement the DSRC protocol as specified by the U.S. Department of Transportation's Core June 2011 System Requirements Specification (SyRS) report (available at www.its.dot.gov/meetings/pdf/CoreSystem_SE_SyRS_RevA%20(2011-06-13).pdf)). In other examples, the DSRC unit or the C-V2X unit may implement communication protocols used to communicatively couple vehicles, roadside units, and/or mobile devices and may be implemented by one of the standards-based networks described above.

On-board transaction unit 118 facilitates ordering and paying (e.g., via the on-board communications platform 116) for resources requested by the vehicle 102. For example, on-board transactions unit 118 may include an interface (e.g., a central console display, an infotainment head unit, etc.) to receive requests for resources from a user, e.g., a driver or a passenger, of vehicle 102. In other examples, on-board communications platform 116 may facilitate communication between vehicle 102 and a user computing device, e.g., a mobile phone, a tablet computer, or laptop computer, within vehicle 102 such that the interface of on-board transaction unit 118 may be presented on the user computing device.

On-board transaction unit 118 initiates a resource request with management server 104 and sends the request via on-board communications platform 116 using one of V2X communication session 134, V2X communication session 136, or other network communications over one of the standard-based networks, such as 5G or Bluetooth®, of network 120. In some such examples, management server 104 may provide a profile and/or a script to specify the manner in which the resource requests are to be collected and/or processed.

Once the negotiation process is complete and a transaction for the requested resource is agreed upon, management server 104 may then complete the transaction (a) directly with on-board transaction unit 118 of vehicle 102, (b) with an associated financial institution via transaction gateway 108, and/or (c) directly with a digital wallet within the selected one of supplier machines 106 providing the requested resource to vehicle 102. In some examples, on-board transaction unit 118 includes transaction account information or a digital wallet capable of making the transaction via on-board communication unit 116. In some examples, on-board transaction unit 118 may have limited pre-authorized funds available. In other examples, on-board transaction unit 118 completes a transaction after receiving credentials (e.g., a password, biometric token, etc.) from a user (e.g., the driver) of vehicle 102 via the interface.

In accordance with one example of the techniques of this disclosure, on-board communications platform 116 communicates with roadside units 132 that exchange traffic information with proximate vehicles and proximate grid controllers to coordinate traffic flow in a geographic area, e.g., one or more grids. For example, roadside units 132 may be coupled to infrastructure and a transportation grid computing system to provide priority access to, for example, express lanes of a freeway. Management server 104 may comprise one of roadside units 132 or may be in communication with one or more of roadside units 132. In this way, management server 104 may negotiate with other vehicles (e.g., supplier machines 106) to provide priority access for freeway usage to vehicle 102 while traveling through the one or more grids controlled by the transportation grid computing system. For example, management server 104 may engage in a negotiation process with the other vehicles 106 that have a specified level of freeway priority over vehicle 102 and that are traveling within a specified transportation grid in response to a request from vehicle 102 for priority access to a particular portion of express lanes of the freeway due to, for example, changing logistical needs and/or changing traffic patterns. An agreed upon transaction for the priority access may be handled by on-board transaction unit 118 of vehicle 102 at the time that the priory access is provided (e.g., when the corresponding vehicle 102 receives another vehicle's priority and enters the priority access lane).

Figure 2:
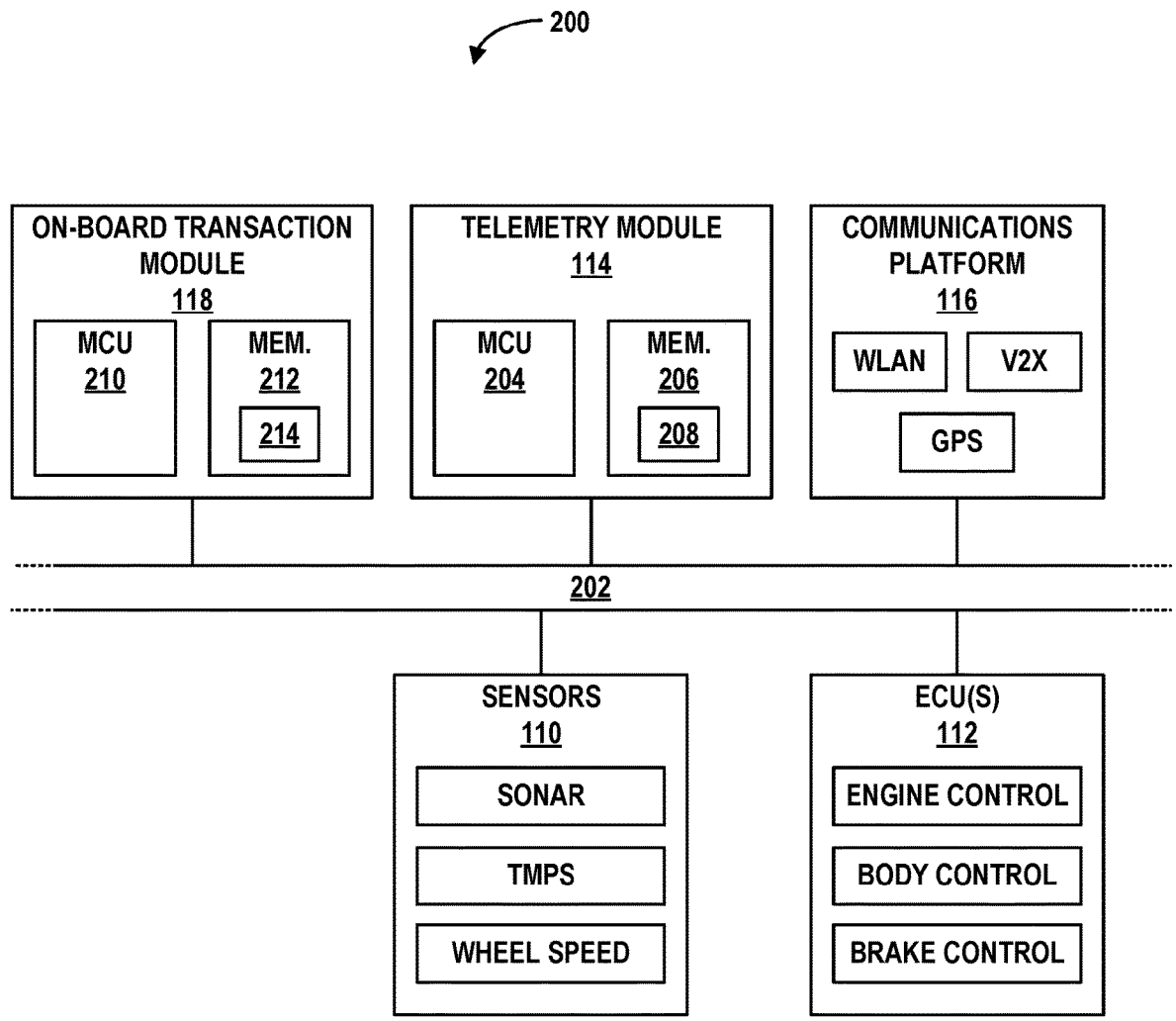
FIG. 2 is a block diagram of example electronic components of the vehicle of FIG. 1, in accordance with the teachings of this disclosure.

FIG. 2 is a block diagram of example electronic components 200 of vehicle 102 of FIG. 1, in accordance with the teachings of this disclosure. In the illustrated example, the electronic components 200 include sensors 110, ECUs 112, telemetry unit 114, on-board communications platform 116, on-board transaction unit 118, and a vehicle data bus 202. In the illustrated example, telemetry unit 114, on-board communications platform 116, and on-board transaction unit 118 are separate electronic components (e.g., systems-on-a-chip (SoCs), integrated circuits, electronic control units, controllers, etc.). However, in some examples, telemetry unit 114, on-board communications platform 116, and on-board transaction unit 118 may be rearranged and/or combined, etc.

In the illustrated example, telemetry unit 114 includes a processor (e.g., a microcontroller (MCU)) 204 and memory 206. In the illustrated example, memory 206 stores telemetry firmware 208, which when executed b processor 204, causes telemetry unit 114 to collect diagnostic information from sensors 110 and/or ECUs 112. The diagnostic information includes, for example, information relating to a status and condition of vehicle 102 over time (e.g., speed, location, engine temperature, piston timing, fuel level, tire pressure, fluid levels, accelerometer data, etc.).

In the illustrated example, on-board transaction unit 118 includes a processor 210 and memory 212. In the illustrated example, memory 212 stores transaction firmware 214, which when executed by processor 210, causes on-board transaction unit 118 to present an interface (e.g., via a central console display or an infotainment head unit of vehicle 102 or via a user computing device within vehicle 102) to receive requests for resources from a user, e.g., a driver or a passenger, of vehicle 102. In some examples, transaction firmware 214 executes one or more scripts provided by management server 104 that specify the manner in which the resource requests are to be collected and/or processed. In addition, transaction firmware 214, when executed by processor 210, causes on-board transaction unit 118 to initiate transactions with one or more of supplier machines 106. In some examples, transaction firmware 214 includes a unique identifier that is associated with an account associated with vehicle 102 at a financial institution to enable management server 104 to execute a smart contract and disburse funds from the account associated with vehicle 102 and to the one of supplier machines 106 in exchange for the supplier machine providing the requested resource to vehicle 102. In other examples, transaction firmware 214 may operate as a mobile wallet that includes the account information and/or one or more single use tokens to provide to management server 104 to facilitate the disbursement of funds to the one of supplier machines 106 in exchange for the supplier machine providing the requested resource to vehicle 102.

Processors 204 and 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). Memory 206 and 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, memory 206 and 212 includes multiple kinds of memory, particularly volatile memory and non-volatile memory.

Memory 206 and 212 is computer readable media on which one or more sets of instructions, such as the software for operating the methods of the present disclosure, can be embedded. The instructions may embody one or more of the methods or logic as described herein. For example, the instructions reside completely, or at least partially, within any one or more of memory 206 and 212, the computer readable medium, and/or within processor 204 and 210 during execution of the instructions.

Vehicle data bus 202 communicatively couples sensors 110, ECUs 112, telemetry unit 114, on-board communications platform 116, and on-board transaction unit 118. In some examples, vehicle data bus 202 includes one or more data buses. For example, a first data bus may couple sensors 110 and ECUs 112 to telemetry unit 114 and a second separate data bus that is encrypted may communicatively couple on-board transaction unit 118 to on-board communication platform 116. Vehicle data bus 202 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
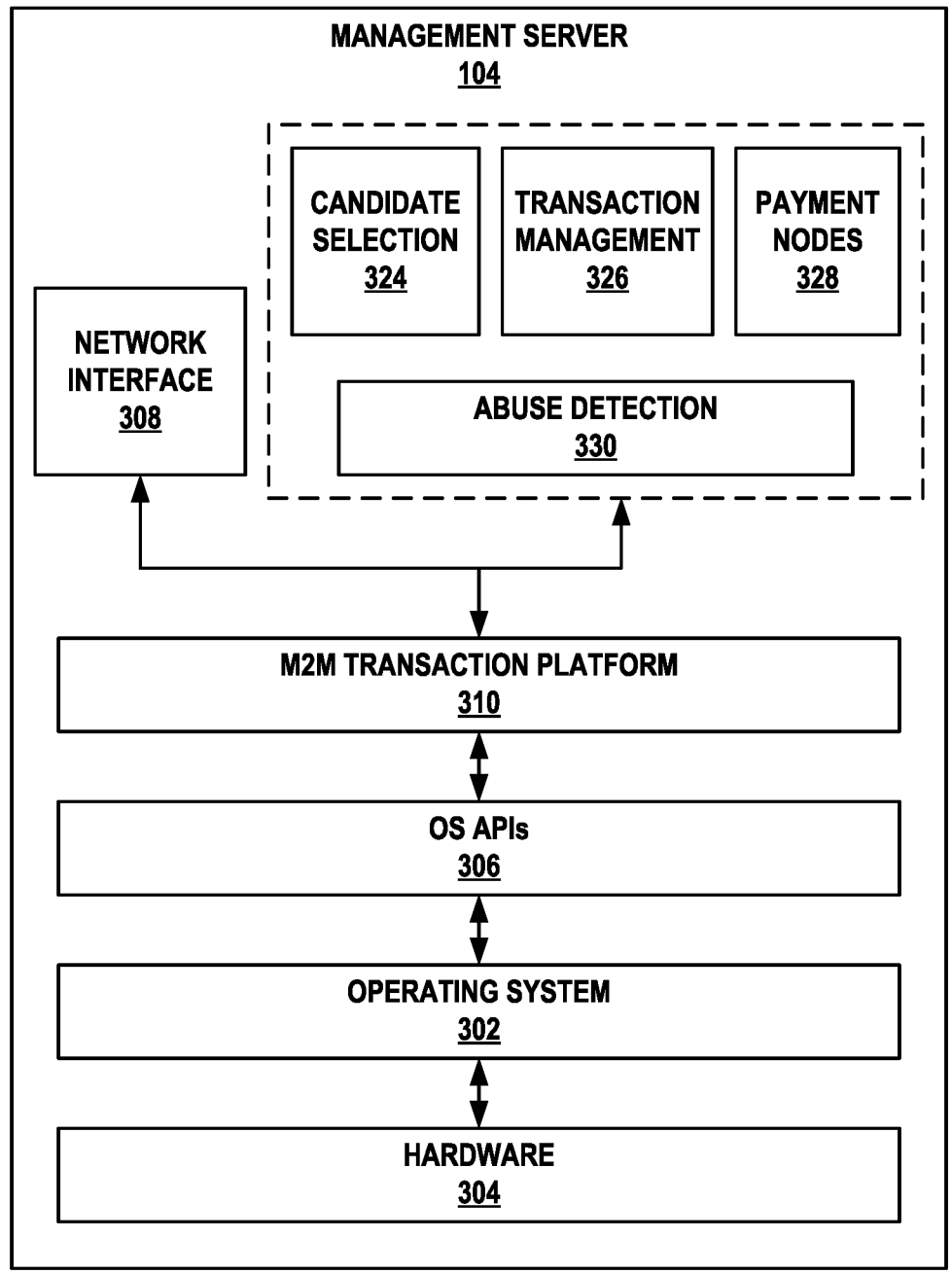
FIG. 3 is a block diagram of an example of the management server of FIG. 1, in accordance with the teachings of this disclosure.

FIG. 3 is a block diagram of an example of management server 104 of FIG. 1, in accordance with the teachings of this disclosure. Management server 104 may be implemented, for example, by one or more physical and/or virtual servers (e.g., virtual machines, containers, etc.).

In the illustrated example, management server 104 includes a device operating system 302 for controlling device hardware resources 304 (e.g., processor(s), memory, network interfaces, etc.) and managing various system level operations, operating system APIs 306 used as interfaces with operating system 302, and a network interface 308 to communicate with external systems and devices. Network interface 308 may be configured to communicate with vehicles, e.g., on-board communications platforms 116 of the vehicle 102, supplier machines, and transaction gateways. In some examples, network interface 308 may comprise a vehicle communication system, e.g., a DSRC unit or a C-V2X unit, that facilitates V2X communication with vehicles, such as vehicle 102 and, in some examples, supplier machines 106.

In the illustrated example, management server 104 further includes a machine-to-machine (M2M) transaction platform 310, a candidate selection unit 324, a transaction management unit 326, payment nodes 328, and abuse detection unit 330. M2M transaction platform 310 autonomously facilitates transactions between vehicles and supplier machines including negotiation and payment for resources provided to the vehicles by the supplier machines.

M2M transaction platform 310 receives, via network interface 308, requests for resources from a plurality of vehicles, where each of the requests includes resource parameters and negotiation parameters specified by a user, e.g., a driver or passenger, of a respective requesting vehicle. The resource parameters may include a geographical location range, a date range, a time range, a rating range, a prioritized list, or an itemized list for the requested resource. The negotiation parameters may include a monetary range for the requested resource along with one or more of offer or bid increments, permissions to surpass a maximum value of the monetary range, time or duration of negotiations, or notification settings in the case of negotiation success or failure.

M2M transaction platform 310 may autonomously manage a list of supplier machines that are verified as providing certain resources. Upon receipt of a request for a resource, candidate selection unit 324 identifies a set of candidate supplier machines from the list of supplier machines verified as providing the requested resource. The set of candidate supplier machines may be selected based on the resource parameters such that the set includes those supplier machines that are available to provide the requested resource to the requesting vehicle within, e.g., a geographical location range, a date range, and/or a time range specified by the resource parameters. In some examples, M2M transaction platform 310 may prioritize processing of the received requests based on the timing information specified by the resource parameters for the requested resource, such as the specified date and time range for which the resource is requested.

In one example, the requested resource comprises freeway priority controlled by a transportation grid computing system and the supplier machines comprise other vehicles traveling within one or more grids controlled by the transportation grid computing system. In this example, candidate selection unit 324 may identify the set of candidate supplier machines as one or more other vehicles that have a specified level of freeway priority over the requesting vehicle and that are traveling within a specified transportation grid in accordance with the resource parameters included in the received request. In some scenarios, M2M transaction platform 310 may determine one or more transportation grids in which the requesting vehicle wants priority access to the freeway based on a current geographical location of the requesting vehicle. For example, the one or more transportation grids may be the transportation grid in which the requesting vehicle is currently traveling and one or more adjacent transportation grids based on a direction and/or speed of the requesting vehicle.

In another example, the requested resource comprises a resource reservation, e.g., a parking space reservation or a room reservation, controlled by a resource vendor computing system and the supplier machines comprise resource vendors or other vehicles. The resource vendors may be parking garages having available-for-reservation parking spaces or lodging establishments having available-for-reservation rooms. In cases where all of the resources are reserved/taken, the supplier machines may comprise other vehicles having reservations for the resources that may be willing to sell their reservations. Candidate selection unit 324 may further filter the supplier machines included in the set of candidate supplier machines based on a specified rating range for the resource or the resource vendor, e.g., a premium parking space within a parking garage or a hotel having a minimum star rating. In this example, candidate selection unit 324 may identify the set of candidate supplier machines as one or more resource vendors or one or more other vehicles that have an available reservation for the requested resource within a specified geographical location range and for at least one of a specified date range or time range in accordance with the resource parameters included in the resource request. In some scenarios, M2M transaction platform 310 may determine the geographical location range as being within a predefined distance from a current geographical location or a specified future geographical location of the requesting vehicle.

In a further example, the requested resource comprises goods, e.g., groceries or household items, with ordering and curbside pickup managed by a merchant computing system and the supplier machines comprise a plurality of stores selling the goods. In this example, candidate selection unit 324 may identify the set of candidate supplier machines as one or more stores that have a specified list of goods available for pickup within a specified geographical location range and a specified time range in accordance with the resource parameters included in the resource request. The specified list of goods may comprise an itemized list and/or a prioritized list of goods provided by the user of the requesting vehicle and included in the resource request. In some scenarios, M2M transaction platform 310 may determine the geographical location range as being within a predefined distance from a current geographical location or a specified future geographical location of the requesting vehicle.

Transaction management unit 326 initiates a negotiation process with each of the supplier machines included in the identified set of candidate supplier machines based on the negotiation parameters included in the resource request. In some scenarios, M2M transaction platform 310 may determine whether to engage in a standard negotiation process or in an auction process with each of the supplier machines, e.g., based on a specified preference of each respective supplier machine. Moreover, M2M transaction platform 310 may determine an initial monetary amount of either a first offer or a first bid to each of the supplier machines based on the negotiation parameters included in the resource request. In addition, M2M transaction platform 310 may determine a time or duration of negotiations, such as a negotiation window or a bidding window, based on the negotiation parameters included in the resource request.

In the case of a standard negotiation, transaction management unit 326 may send, via network interface 308, a notification to each of the supplier machines within the identified set of candidate supplier machines offering an initial amount of money in exchange for the resource. If none of the supplier machines accepts the offer, transaction management unit 326 may incrementally increase the amount of money up to a threshold specified by the resource parameters included in the resource request. In the case of an auction, transaction management unit 326 may send, via network interface 308, a notification to each of the supplier machines within the identified set of candidate supplier machines including a bid for the resource.

Once transaction management unit 326 receives an acceptance of the offer during the negotiation window or an acceptance of the bid upon expiration of the bidding window from one of the supplier machines, a transaction for the requested resource is agreed upon between the requesting vehicle and the one of the supplier machines. Transaction management unit 326 then creates a smart contract for the transaction between the requesting vehicle, the supplier machine, and management server 104. The smart contract may be written to block chain, exchanged via communication channels between the vehicle and the supplier machines, or otherwise securely stored. In addition, in cases where the supplier machine providing the requested resource is not another vehicle, transaction management unit 326 may send a geographic location of the supplier machine to the requesting vehicle to cause the vehicle to navigate to the supplier machine. In some examples, providing the location of the supplier machine may cause the vehicle to autonomously navigate to the supplier machine. In some examples, providing the location of the supplier machine may cause the location to appear on a navigation system of the vehicle to guide a driver to the supplier machine.

M2M transaction platform 310 facilitates an electronic transfer of funds between the vehicle and the supplier machine in exchange for the supplier machine providing the resource to the vehicle in accordance with the transaction agreed upon during the negotiation process. Payment nodes 328 are each configured to execute the smart contracts formed between the requesting vehicle, the supplier machine, and management server 104 once the resource request is fulfilled to disburse the funds from the requesting vehicle to the supplier machine that provided the resource. One or more of payment nodes 328 are in communication with transaction gateway 108 of FIG. 1 connected to one or more financial institutions. In addition, one or more payment nodes 328 may be associated with one or more mobile wallet or other payment applications, e.g., including peer-to-peer payment applications.

As one example, the one of payment nodes 328 associated with the financial institution of the requesting vehicle may submit the transaction defined in the smart contract via network interface 308 to transaction gateway 108 to disburse funds for the transaction from an associated account at the financial institution of the requesting vehicle to an account associated with the supplier machine at the same or a different financial institution. As another example, one of payment nodes 328 may execute the smart contract to disburse funds directly from a digital wallet included within the requesting vehicle, e.g., in on-board transaction module 118 of vehicle 102 of FIG. 1, to a digital wallet included within the supplier machine, or some combination of embedded digital wallets and financial institution accounts accessible via transaction gateway 108.

In some examples, M2M transaction platform 310 may further autonomously facilitate potential abuse detection, e.g., within resource vendor computing systems. Along with the list of supplier machines, M2M transaction platform 310 may further autonomously manage a list of the other vehicles that frequently put their reserved resources up for auction and/or frequently sell their reserved resources. Abuse detection unit 330 may analyze the list of frequent suppliers to determine whether users of the vehicles are abusing the vendor resource system by, for example, continuously reserving a premium parking space in a parking garage and, instead of using the reservation, continuously offering the parking space to requesting vehicles at an inflated price. In scenarios where abuse detection unit 330 identifies a vehicle that is potentially abusing the reservation system, M2M transaction platform 310 may remove the frequent supplier from its list of supplier machines or otherwise block the vehicle from participating in the reservation system.

Figure 4:
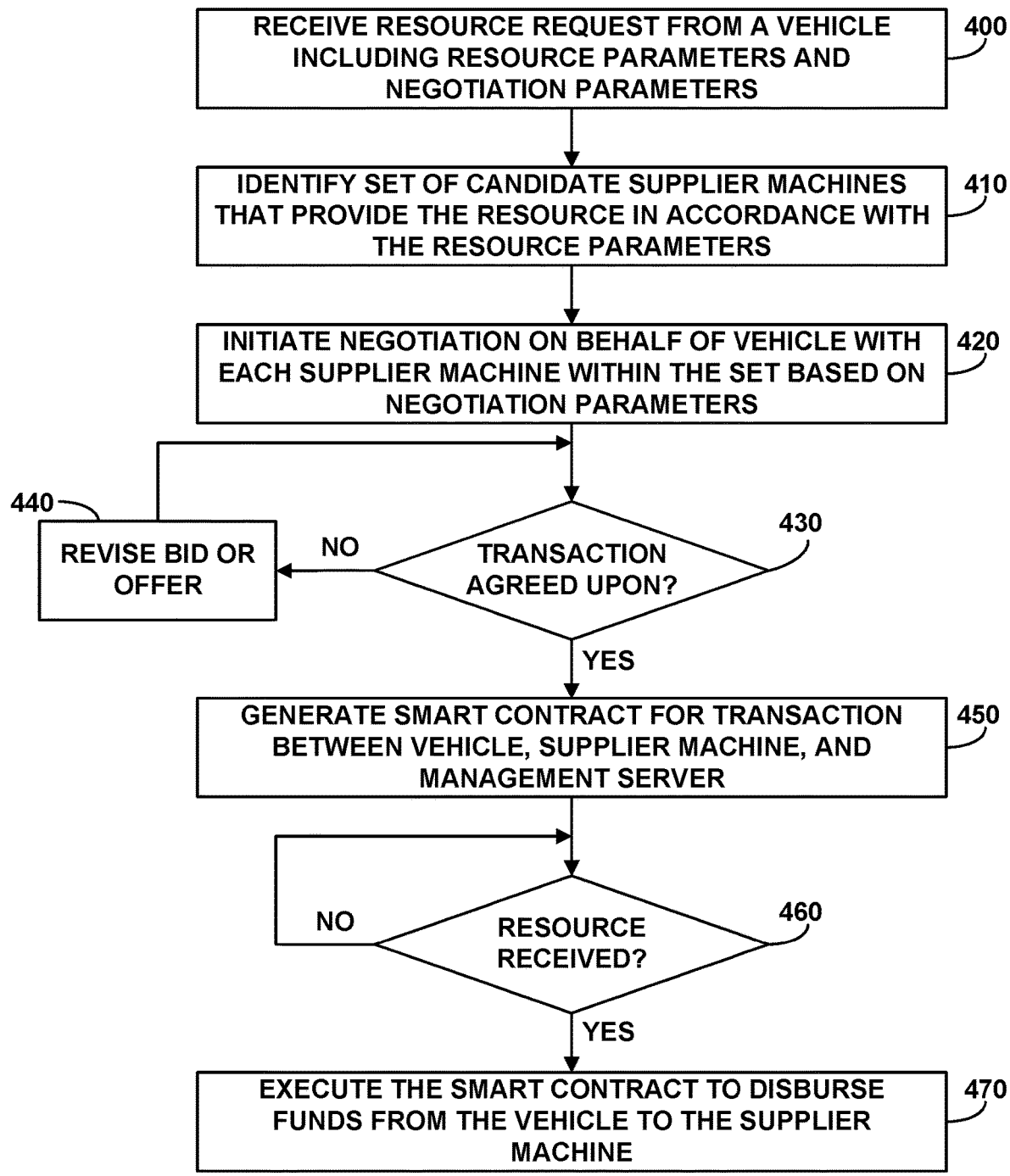
FIG. 4 is a flowchart illustrating an example operation of facilitating a transaction for a requested resource between a vehicle and a supplier machine, in accordance with the teachings of this disclosure.

FIG. 4 is a flowchart illustrating an example operation of facilitating a transaction for a requested resource between a vehicle and a supplier machine, in accordance with the teachings of this disclosure. The example operation of FIG. 4 is described with respect to management server 104 of FIGS. 1 and 3.

Management server 104 receives, via network interface 308 and from vehicle 102, a request for a resource, the request including one or more resource parameters and one or more negotiation parameters (400). For example, management server 104 may comprise a roadside unit, e.g., one of roadside units 132, within traffic management system 122 such that management server 104 receives the resource request from vehicle 102 using V2X communication. As another example, management server 104 may be in communication with a plurality of roadside nodes 132 within traffic management system 122 such that management server 104 receives the resource request from one of roadside nodes 132, e.g., roadside node 132A, using network communications, where roadside node 132A is in communication with vehicle 102 using V2X communication.

Candidate selection unit 324 identifies a set 130 of candidate supplier machines that includes one or more supplier machines 106 that provide the resource requested by vehicle 102 in accordance with the one or more resource parameters included in the request from vehicle 102 (410). The resource parameters specified in the resource request from vehicle 120 may include one or more of a geographical location range, a date range, a time range, a rating range, a prioritized list, or an itemized list for the resource requested by vehicle 102. In one example, the resource parameters may include a geographical location of vehicle 102, e.g., a determined geographical location of vehicle 102 at a current time or a specified geographical location of the vehicle at a future time depending on when the requested resource is needed. In this example, candidate selection unit 324 identifies one or more supplier machines 106 that provide the resource requested by vehicle 102 and are within a predefined distance from the geographical location of vehicle 102.

Transaction management unit 326 initiates, on behalf of vehicle 102 and via network interface 308, a negotiation process with each of supplier machines 106 within set 130 of candidate supplier machines based on the one or more negotiation parameters included in the request from vehicle 102 (420). In examples where supplier machines 106 comprise one or more other vehicles, management server 104 may initiate the negotiation process with the one or more other vehicles using V2X communication, or may initiate the negotiation process with the other vehicles via one or more of roadside nodes 132, which are in communication with the other vehicles using V2X communication. In other examples, where supplier machines 106 comprise resource vendor computing systems or merchant computing systems, management server 104 may initiate the negotiation process with the supplier machines using network communications.

The negotiation parameters specified in the resource request from vehicle 102 may at least include a monetary range that a user of vehicle 102 is willing to pay for the resource requested by vehicle 102. In addition to the monetary range, the negotiation parameters may further include one or more of offer or bid increments, permissions to surpass a maximum value of the monetary range, time or duration of negotiations, or notification settings in the case of negotiation success or failure.

In one example, to initiate the negotiation process, transaction management unit 326, sends, via network interface 308, a first offer for the resource to each of the one or more supplier machines 106 within set 130 of candidate supplier machines. Transaction management unit 326 may determine a first monetary amount of the first offer and a negotiation window based on the negotiation parameters. If an acceptance is received from one of the supplier machines, e.g., supplier machine 106A, within set 130 of candidate supplier machines during the negotiation window, transaction management unit 326 may send, via network interface 308, a notification of success to vehicle 102 and supplier machine 106A.

In another example, to initiate the negotiation process, transaction management unit 326 sends, via network interface 308, a bid for the resource to at least one of the supplier machines, e.g., supplier machine 106A, within set 130 of candidate supplier machines as part of an auction for the resource provided by supplier machine 106A. Transaction management unit 326 may determine a monetary amount of the bid and a bidding window based on the negotiation parameters. If an acceptance is received from supplier machine 106A upon expiration of the bidding window, transaction management unit 326 may send, via network interface 308, a notification of success to vehicle 102 and supplier machine 106A.

In the example illustrated in FIG. 4, if no transaction is agreed upon between vehicle 102 and any of the supplier machines 106 within set 130 of candidate supplier machines (NO branch of 430), transaction management unit 326 then revises the previous bid or offer and sends the revised bid or offer back to each of supplier machines 106 within set 130 of candidate supplier machines (440). For example, if no acceptance is received from any of the supplier machines 106 within set 130 of candidate supplier machines during the negotiation window, transaction management unit 326 may send a second offer for the resource to each of the supplier machines 106 within set 130 of candidate supplier machines. Transaction management unit 326 may automatically select a second monetary amount for the second offer that is greater than the first monetary amount of the first offer by an increment determined based on the negotiation parameters.

In other examples, if transaction management unit 326 is unable to further increase the bid or offer based on the negotiation parameters specified by vehicle 102, candidate selection unit 324 may revise the set 130 of candidate supplier machine based on revised resource parameters received from vehicle 102. The revised resource parameters may be automatically determined by candidate selection unit 324 based on ranges included in the received resource parameters, or may be received from vehicle 102 in response to a notification that no agreement for the resource could be reached. Candidate selection unit 324 may then identify a new set of candidate supplier machines that includes one or more supplier machines 106 that provide the resource requested by vehicle 102 in accordance with the revised resource parameters (410). In still other examples, if transaction management unit 326 is unable to further increase the bid or offer based on the negotiation parameters specified by vehicle 102, based on the resource being no longer available, or based on the negotiation or bidding window being closed, transaction management unit 326 may send a notification via network interface 308 to vehicle 102 indicating that no agreement for the resource could be reached.

Once a transaction for the resource is agreed upon between vehicle 102 and supplier machine 106A (YES branch of 430), transaction management unit 326 generates a smart contract for the transaction between vehicle 102, supplier machine 106A, and management server 104 (450). Transaction management unit 326 may write the smart contract to a block chain, exchange the smart contract via communication channels with the other machines, or otherwise securely store the smart contract, e.g., in a local or remote memory. The smart contract may be stored until supplier machine 106A provides the resource to vehicle 102 in accordance with the agreed upon transaction (NO loop of 460). In some examples, where the transaction is time limited, e.g., an agreement to rent a parking space for a specific date, the smart contract may expire if not executed by the time limit, e.g., the parking space is not available for the vehicle to use on the specific date.

Once supplier machine 106A provides the resource to vehicle 102 (YES branch of 460), payment nodes 328 facilitate an electronic transfer of funds between vehicle 102 and supplier machine 106A by executing the smart contract to disburse the funds from one of a digital wallet within vehicle 102 or an account associated with vehicle 102 at a first financial institution and to one of a digital wallet within supplier machine 106A or an account associated with supplier machine 106A at a second financial institution (470).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
receiving, by a management server executing on an electronic platform and from a vehicle in response to user input, a request for a resource, the request including one or more resource parameters and one or more negotiation parameters;
identifying, by the management server of the electronic platform, a set of candidate supplier machines from a plurality of supplier machines in communication with the management server, wherein the set of candidate supplier machines includes one or more supplier machines that provide the resource requested by the vehicle in accordance with the one or more resource parameters included in the request from the vehicle;
initiating, by the management server of the electronic platform on behalf of the vehicle and without additional user input, a negotiation process with each of at least two supplier machines within the set of candidate supplier machines based on the one or more negotiation parameters included in the request from the vehicle, wherein initiating the negotiation process comprises:
determining a monetary amount for the resource based on the one or more negotiation parameters, and
sending an offer or a bid for the resource including the monetary amount to each of the at least two supplier machines within the set of candidate supplier machines; and once a transaction for the resource is agreed upon between the vehicle and a supplier machine within the set of candidate supplier machines, facilitating, by the management server of the electronic platform and without additional user input, an electronic transfer of funds between the vehicle and the supplier machine in exchange for the supplier machine providing the resource to the vehicle in accordance with the transaction.

2. The method of claim 1, further comprising, once the transaction for the resource is agreed upon, generating, by the management server, a smart contract for the transaction between the vehicle, the supplier machine, and the management server.

3. The method of claim 2, wherein generating the smart contract comprises writing the smart contract to a block chain.

4. The method of claim 2, wherein facilitating the electronic transfer of funds comprises, once the supplier machine provides the resource to the vehicle, executing, by the management server, the smart contract to disburse the funds from one of a digital wallet within the vehicle or an account associated with the vehicle at a first financial institution and to one of a digital wallet within the supplier machine or an account associated with the supplier machine at a second financial institution.

5. The method of claim 1, wherein the one or more resource parameters include a geographical location of the vehicle, wherein the geographical location of the vehicle comprises one of a determined geographical location of the vehicle at a current time or a specified geographical location of the vehicle at a future time, and
wherein identifying the set of candidate supplier machines comprises identifying the one or more supplier machines that provide the resource requested by the vehicle and are within a predefined distance from the geographical location of the vehicle.

6. The method of claim 1, wherein the one or more resource parameters include one or more of a geographical location range, a date range, a time range, a rating range, a prioritized list, or an itemized list for the resource requested by the vehicle.

7. The method of claim 1, wherein the one or more negotiation parameters include at least a monetary range that a user of the vehicle is willing to pay for the resource requested by the vehicle.

8. The method of claim 1, wherein sending the offer or the bid for the resource comprises:
sending a first offer for the resource including a first monetary amount to at least one of the supplier machines within the set of candidate supplier machines, wherein the first monetary amount of the first offer is determined based on the one or more negotiation parameters; and
wherein, if an acceptance is received from a supplier machine during a negotiation window, the transaction for the resource is agreed upon between the vehicle and the supplier machine from which the acceptance is received.

9. The method of claim 8, further comprising, if no acceptance is received from at least one of the supplier machines during the negotiation window, sending a second offer for the resource including a second monetary amount to each of the at least two supplier machines within the set of candidate supplier machines, wherein the second monetary amount of the second offer is greater than the first monetary amount of the first offer by an increment, and wherein the increment is determined based on the one or more negotiation parameters.

10. The method of claim 1, wherein sending the offer or the bid for the resource comprises:
sending the bid for the resource including the monetary amount to at least one of the supplier machines within the set of candidate supplier machines; and
wherein, if an acceptance is received from a supplier machine upon expiration of a bidding window, the transaction for the resource is agreed upon between the vehicle and the supplier machine from which the acceptance is received.

11. The method of claim 1, wherein receiving the request from the vehicle comprises one of:
receiving the request from the vehicle using vehicle-to-everything (V2X) communication; or
receiving the request from a roadside node that is in communication with the vehicle using vehicle-to-everything (V2X) communication.

12. The method of claim 1, wherein the one or more supplier machines within the set of candidate supplier machines comprise one or more other vehicles, and wherein initiating the negotiation process comprises initiating the negotiation process with the one or more other vehicles using vehicle-to-everything (V2X) communication.

13. The method of claim 1, wherein the management server is associated with a traffic management system and is in communication with a transportation grid computing system, wherein the plurality of supplier machines comprises a plurality of other vehicles, wherein the resource requested by the vehicle comprises freeway priority controlled by the transportation grid computing system, and
wherein identifying the set of candidate supplier machines from the plurality of supplier machines comprises identifying one or more other vehicles from the plurality of other vehicles that have a specified level of freeway priority over the vehicle and that are traveling within a specified transportation grid in accordance with the one or more resource parameters included in the request from the vehicle.

14. The method of claim 1, wherein the management server is associated with a traffic management system and is in communication with a parking management computing system, wherein the plurality of supplier machines comprises a plurality of parking garages or a plurality of other vehicles, wherein the resource requested by the vehicle comprises a parking space reservation managed by the parking management computing system, and
wherein identifying the set of candidate supplier machines from the plurality of supplier machines comprises identifying one or more parking garages from the plurality of parking garages or one or more other vehicles from the plurality of other vehicles that have an available reservation for at least one parking space within a specified geographical location range and for at least one of a specified date range or time range in accordance with the one or more resource parameters included in the request from the vehicle.

15. The method of claim 1, wherein the management server is associated with a traffic management system and is in communication with a lodging management computing system, wherein the plurality of supplier machines comprises a plurality of lodging establishments or a plurality of other vehicles, wherein the resource requested by the vehicle comprises a room reservation managed by the lodging management computing system, and wherein identifying the set of candidate supplier machines from the plurality of supplier machines comprises identifying one or more establishments from the plurality of lodging establishments or one or more other vehicles from the plurality of other vehicles that have an available reservation for at least one room within a specified geographical location range and for a specified date range in accordance with the one or more resource parameters included in the request from the vehicle.

16. The method of claim 1, wherein the management server is associated with a traffic management system and is in communication with a merchant computing system, wherein the plurality of supplier machines comprises a plurality of stores, wherein the resource requested by the vehicle comprises goods sold by the stores with ordering and curbside pickup managed by the merchant computing system, and
wherein identifying the set of candidate supplier machines from the plurality of supplier machines comprises identifying one or more stores from the plurality of stores that have a specified list of goods available for pickup within a specified geographical location range and a specified time range in accordance with the one or more resource parameters included in the request from the vehicle.

17. A management server executing on an electronic platform comprising:
one or more interfaces; and
one or more processors in communication with the one or more interfaces and configured to:
receive, from a vehicle in response to user input, via the one or more interfaces, a request for a resource, the request including one or more resource parameters and one or more negotiation parameters;
identify a set of candidate supplier machines from a plurality of supplier machines in communication with the management server, wherein the set of candidate supplier machines includes one or more supplier machines that provide the resource requested by the vehicle in accordance with the one or more resource parameters included in the request from the vehicle;
initiate, on behalf of the vehicle and without additional user input, via the one or more interfaces, a negotiation process with at least one of the supplier machines within the set of candidate supplier machines based on the one or more negotiation parameters included in the request from the vehicle, wherein to initiate the negotiation process, the one or more processors are configured to:
determine a monetary amount for the resource based on the one or more negotiation parameters, and
send an offer or a bid for the resource including the monetary amount to each of the at least two supplier machines within the set of candidate supplier machines; and
once a transaction for the resource is agreed upon between the vehicle and a supplier machine within the set of candidate supplier machines, facilitate, without additional user input, via the one or more interfaces, an electronic transfer of funds between the vehicle and the supplier machine in exchange for the supplier machine providing the resource to the vehicle in accordance with the transaction.

18. The management server of claim 17, wherein the one or more processors are configured to, once the transaction for the resource is agreed upon, generate a smart contract for the transaction between the vehicle, the supplier machine, and the management server; and
wherein, to facilitate the electronic transfer of funds, the one or more processors are configured to, once the supplier machine provides the resource to the vehicle, execute the smart contract to disburse the funds from one of a digital wallet within the vehicle or an account associated with the vehicle at a first financial institution and to one of a digital wallet within the supplier machine or an account associated with the supplier machine at a second financial institution.

19. The management server of claim 17, wherein, to send the offer or the bid for the resource, the one or more processors are configured to:
send a first offer for the resource including a first monetary amount to at least one of the supplier machines within the set of candidate supplier machines, wherein the first monetary amount of the first offer is determined based on the one or more negotiation parameters;
wherein, if no acceptance is received from the at least one of the supplier machines during a negotiation window, send a second offer for the resource including a second monetary amount to each of the at least two supplier machines within the set of candidate supplier machines, wherein the second monetary amount of the second offer is greater than the first monetary amount of the first offer by an increment, and wherein the increment is determined based on the one or more negotiation parameters; and
wherein, if an acceptance is received from a supplier machine during the negotiation window, the transaction for the resource is agreed upon between the vehicle and the supplier machine from which the acceptance is received.

20. The management server of claim 17, wherein, to send the offer or the bid for the resource, the one or more processors are configured to:
send the bid for the resource including the monetary amount to at least one of the supplier machines within the set of candidate supplier machines; and
wherein, if an acceptance is received from a supplier machine upon expiration of a bidding window, the transaction for the resource is agreed upon between the vehicle and the supplier machine from which the acceptance is received.

21. The management server of claim 17, wherein, to receive the request from the vehicle, the one or more interfaces are configured to:
receive the request from the vehicle using vehicle-to-everything (V2X) communication; or
receive the request from a roadside node that is in communication with the vehicle using vehicle-to-everything (V2X) communication.

22. The management server of claim 17, wherein the one or more supplier machines within the set of candidate supplier machines comprise one or more other vehicles, and wherein, to initiate the negotiation process, the one or more processors are configured to initiate, on behalf of the vehicle and via the one or more interfaces, the negotiation process with the one or more other vehicles using vehicle-to-everything (V2X) communication.

23. A non-transitory computer readable medium comprising instructions that, when executed, cause one or more processors of a management server executing on an electronic platform to:

receive, from a vehicle in response to user input, a request for a resource, the request including one or more resource parameters and one or more negotiation parameters;

identify a set of candidate supplier machines from a plurality of supplier machines in communication with the management server, wherein the set of candidate supplier machines includes one or more supplier machines that provide the resource requested by the vehicle in accordance with the one or more resource parameters included in the request from the vehicle;

initiate, on behalf of the vehicle and without additional user input, a negotiation process with at least one of the supplier machines within the set of candidate supplier machines based on the one or more negotiation parameters included in the request from the vehicle, wherein to initiate the negotiation process, the instructions cause the one or more processors to:
  determine a monetary amount for the resource based on the one or more negotiation parameters, and
  send an offer or a bid for the resource including the monetary amount to each of the at least two supplier machines within the set of candidate supplier machines; and once a transaction for the resource is agreed upon between the vehicle and a supplier machine within the set of candidate supplier machines, facilitate, without additional user input, an electronic transfer of funds between the vehicle and the supplier machine in exchange for the supplier machine providing the resource to the vehicle in accordance with the transaction.

* * * * *